Dec. 1, 1925.
R. Y. BOVEE
1,563,547
SPRING SUSPENSION FOR VEHICLES
Filed Oct. 22, 1924
2 Sheets-Sheet 1
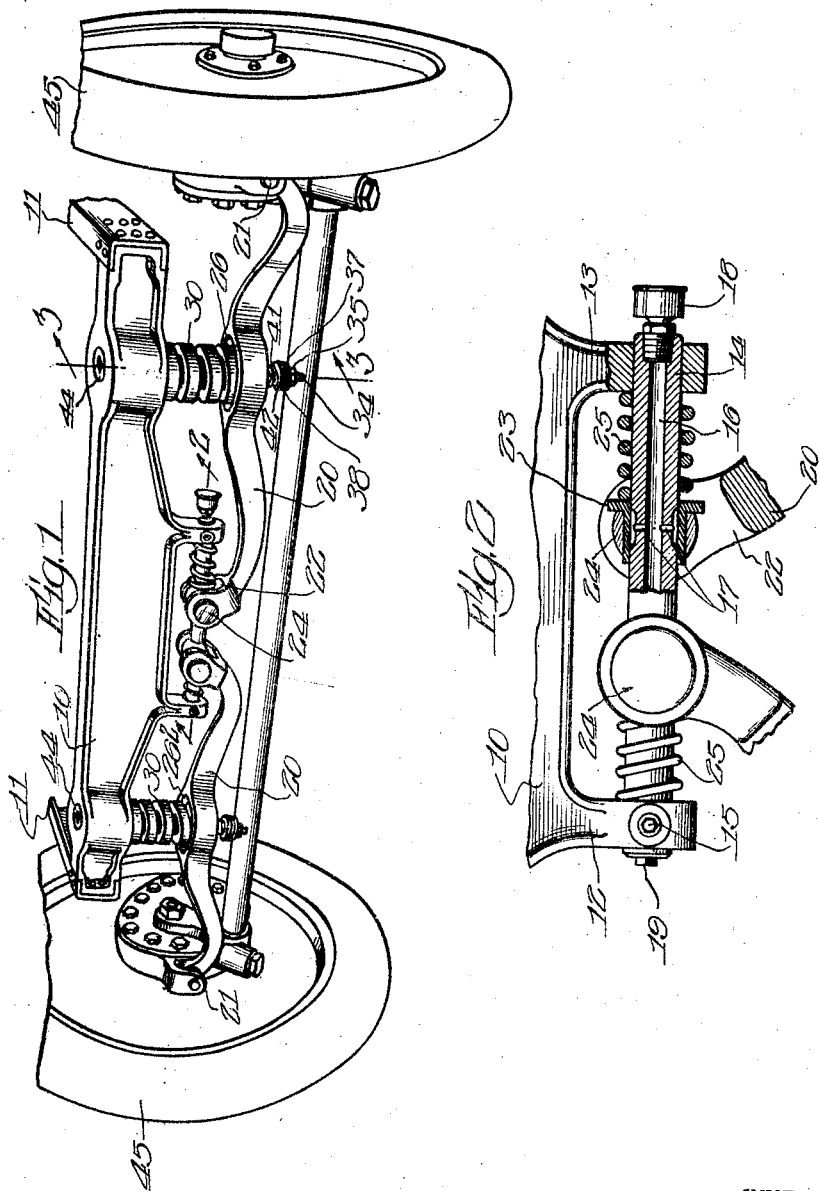
INVENTOR.
Ransom Y. Bovee
BY
ATTORNEY

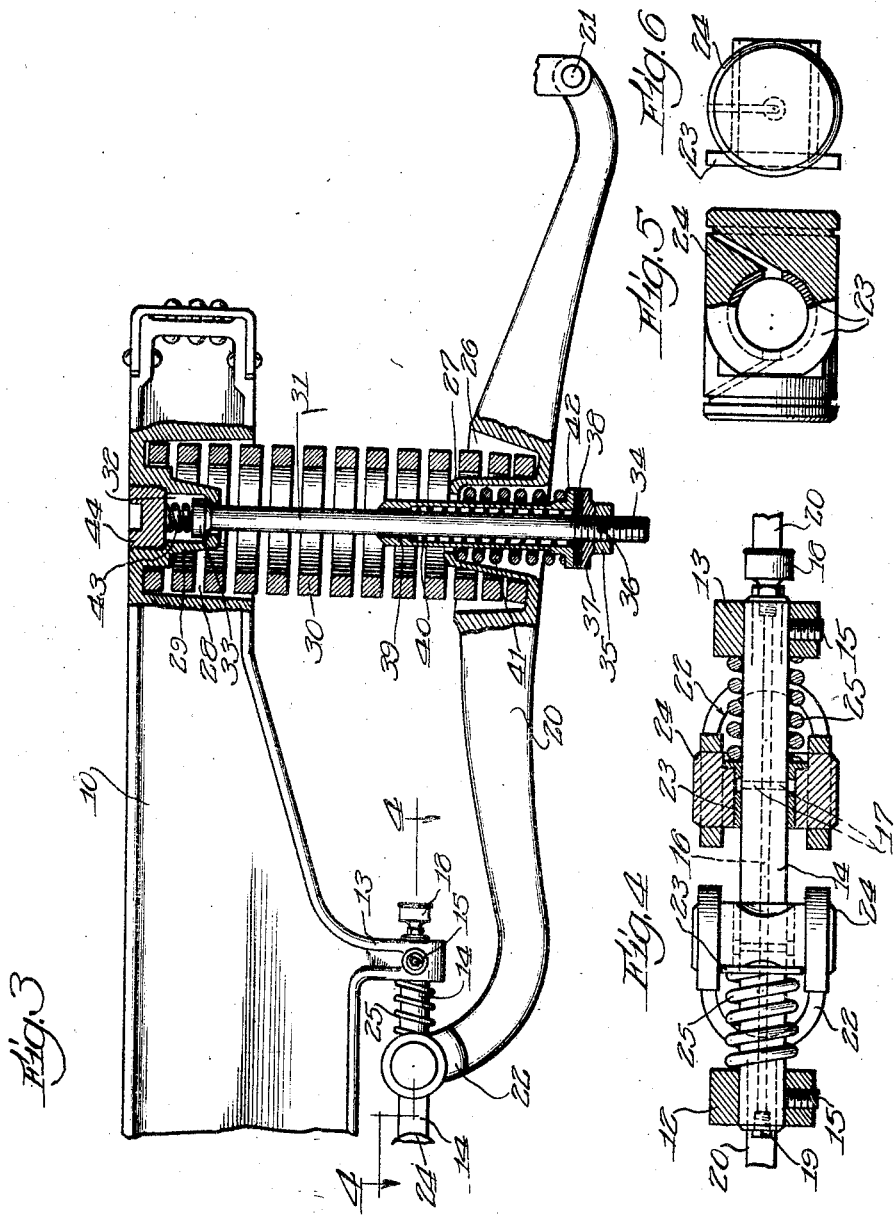

Patented Dec. 1, 1925.

1,563,547

UNITED STATES PATENT OFFICE.

RANSOM Y. BOVEE, OF MAYWOOD, ILLINOIS, ASSIGNOR TO BOVEE TRANSMISSION CORPORATION, OF CHICAGO, ILLINOIS, A CORPORATION OF ILLINOIS.

SPRING SUSPENSION FOR VEHICLES.

Application filed October 22, 1924. Serial No. 745,175.

*To all whom it may concern:*

Be it known that I, RANSOM Y. BOVEE, a citizen of the United States, residing at Maywood, in the county of Cook and State of Illinois, have invented certain new and useful Improvements in Spring Suspensions for Vehicles, of which the following is a specification.

This invention relates to improvements in spring suspension for vehicles, and one of the objects of the same is to provide an improved suspension free from latent spring friction usual in leaf spring construction, and in which latter the spring action is maintained by a series of springs whose lateral deflection is only accomplished by the sliding of one spring on top of another under the sluggish resistance produced thereby.

In the present invention there is provided a coil spring suspension in which there is no frictional engagement action in the movement of the spring and further action is supplemented through a compound leverage suspension of weight, balancing or opposing the force of shocks with a reverse thrust through compound levers, creating an opposing action equivalent to the original thrust or shock delivered upon the wheels of the vehicle.

This invention further provides a swiveling movement between the vehicle frame supporting bracket and the compound leverage weight supporting arms or levers, permitting of a fixed arc of motion between the vehicle frame and the tie rods which attach the axle member and springs to the vehicle without having to bend or deflect any of the solid mechanism of the spring structure. The weight supporting coil springs being flexible with reference to a relative deflection or turning action upon the arms permits the compound leverage supporting member to be moved upon a universal pivot support, giving the arm both lateral sliding and swivel actions thereabout in both directions of pivotal rotation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a perspective view of a spring suspension of this character constructed in accordance with the principles of this invention.

Figure 2 is an enlarged detail view partly in elevation, partly in section and with parts broken away, showing the inner ends of the weight supporting arms and the mechanism associated therewith.

Figure 3 is an enlarged detail view partly in elevation and partly taken on line 3—3, of Figure 1.

Figure 4 is a detail view taken on line 4—4, Figure 3.

Figure 5 is a detail view partly in elevation and partly in section of one of the bearing members for the inner end of one of the weight supporting arms.

Figure 6 is a left hand end elevation of Figure 5.

Referring more particularly to the drawings the numeral 10 designates generally a hanger which is connected in any suitable manner with a portion of the chassis 11 of the vehicle or may, if desired, constitute a portion of the chassis. Depending below the member 10 and centrally thereof are spaced projections 12—13 constituting bearings for a tubular shaft or member 14, the latter being held against displacement and rotation with respect thereto in any suitable manner such as by means of fastening devices 15. This member 14 is provided with a channel 16 extending therethrough, and ports 17 communicating with the channel 16 extend through the side of the member 14 to permit lubrication, which is inserted in one end, to be supplied to the members which have bearings upon the shaft or member 14, and to be hereinafter described. The inlet end of the channel 16 may be closed in any suitable manner such as by means of a lubrication or grease cup 18, and the other end thereof is closed preferably by means of a plug 19.

Disposed below the member 10 are arms or levers 20, one end of each of which is pivotally connected as at 21 with a fixed portion of the vehicle structure. As the construction of each of these arms 20 is the same, the description of one will apply equally as well to them both.

The inner end of the arm is preferably bifurcated as at 22 and disposed within the bifurcation is a collar 23 and through which collar the shaft or member 14 passes, the collar being mounted loosely thereupon. A member 24 is also disposed within the bifurcation 22 and has bearings in the walls forming the bifurcated portion of the arm 20. The collar 23 is journaled in the member 24 and the shaft or member 14 also passes through this member 24, so that the end of the arm 20 will be connected with the shaft 14 for movements in directions lengthwise of the member 14, and also in a manner that the arm 20 may be moved laterally with respect to the shaft or member 14, during which movement the collar 23 will rotate about the member 14.

Interposed between each of the collars 23 and the respective bearings 12 and 13 of the member 10, are springs 25, one end of each of which abuts the collar 23 and the other end the respective bearings 12—13. These springs 25 tend normally to move the ends of the arms 20 in directions lengthwise of the shaft or bearing 14 and toward each other. The arms 20 are of such a length that they will be normally spaced from each other and the space is of such a size that when the arms 20 are rocked in directions to cause the deflected ends to move towards each other, the ends of the arms will not be moved into engagement.

With this construction it will be noted that the member 14 serves in the capacity of a swivel bar providing for toggle action in the movement of the arms 20, permitting their extremities to approach and recede from each other as they are deflected up and down around their circumferential arc of pivotal connection at the point 21. This member 14 and the ends of the arms in connection therewith also provide for a swivel motion of the parts 24, 23 and 20 as a cooperating unit permitting the arms 20 to be swung about their pivotal connection with the member 14 in a lateral direction of movement, while also pivoting about the member 24 to permit a relative rotational movement on the member 24 as the members 10 and 20 change their position with respect to each other.

Interposed between the ends of the arm 20 is a recess or pocket 26 opening through the upper face thereof and provided with a projection 27 arising from the seat of the recess.

Opening through the lower face of the member 10 and above the pocket or recess 26 of the arm 20, is a recess 28, having a centrally depending portion 29. An elastic member such as a coil spring 30 is interposed between the member 10 and arm 20. One end of the spring is seated in the recess 26 and encompasses the projection 27, while the other end of the spring is seated in the recess 28 and encompasses the projection 29. This spring forms a cushion or resisting element between the member 10 and arm 20.

The spring is held against lateral displacement in any desired or suitable manner but preferably by means of a tie rod or bolt 31 which passes through the projection 29, the latter being preferably hollow as at 32, the head 33 of the bolt 31 resting upon the bottom of the projection 29. This tie rod or bolt may be of any desired length and passes through the projection 27 in the seat 26 of the arm 20 to extend below the bottom of the arm and is provided on its extremity with threads 34 to receive a nut 35, the latter being secured against relative movement with respect to the bolt in any suitable manner, such as by means of a fastening device 36. A collar 37 is loosely mounted upon the end of the bolt 31 and rests upon the nut 35. A gland 38 of any suitable material rests upon the collar 37 and is provided for the purpose of deadening the noise between two metallic surfaces. A tubular member 39 encompasses the bolt 31 and extends through the projection 29 in the seat 26 of the arm 21 and projects beyond the projection 27 and into the coil spring 30. The open end of the tubular member 39 rests against the washer 38 and a coil spring 40 is disposed within the tubular member 39 and encompasses the rod or bolt 31. One end of the spring 40 rests against the bottom of the tubular member 39 and the other end rests against the washer or gland 38.

The external diameter of the tubular member 39 is somewhat less than the internal diameter of the tubular projection 27 and a coil spring 41 is arranged to extend into the projection 27 and encompasses the lower portion of the tubular member 39. One end of the spring 41 rests against the bottom of the projection 27 and the other end against a flange 42 on the end of the tubular projection 39. This spring 41 operates as a snubber to assist in retarding or checking the rebound action of the mechanism. The spring 40 is provided as a means for holding the spring 41 seated. That is to say, when the member 10 and the arm 20 are moved toward each other to compress the spring 30, the end of the rod or bolt 31 will be projected to a still further extent through the arm 20 and the spring 41 would, if no means were provided to prevent, follow the tubular member 39 and would become unseated from the bottom of the projection 27, with the result that when the spring 30 is expanded, the end of the spring 40 would be forced against the bottom of the projection 29 and would produce considerable noise. By providing the spring 40 it will be noted that when the spring 30 is compressed the tie rod or bolt 31 will move through the arm 20 and the spring 41 will be held upon its seat by reason of the fact that during this movement the spring 40 will expand and will hold the tubular member 39 against movement with respect to the arm 20. This is accomplished by reason of the fact that the tie rod 31 will slide through the member 39 and the nut 35 and the washer or gland 38 will move away from the end of the tubular member 39 as the tie rod or bolt 31 passes therethrough. Upon the return movement, the noise will be prevented by reason of the washer or gland 38 striking the end of the tubular member 39.

Arranged within the projection 29 is a coil spring 43, one end of which rests upon the end of the tie rod or bolt 31 and the other end is engaged by an adjustable plug 44 seated in the projection 29 and forming a closure therefor. This tends to hold the tie rod or bolt 31 in a proper position.

It will be noted that the opening in the bottom of the projection 29, through which the rod or bolt 31 passes and the opening in the bottom of the projection 27, through which the tubular member 39 passes, are of diameters considerably greater than the diameters of the parts which pass therethrough. This is provided as a means for permitting a lateral movement of the arms 20 with respect to the member 10, so as not to interfere with the rotational movement of the ends of the arm 20 upon the shaft or member 14, through the medium of the collar 23.

If desired and as a means to lubricate the head 33 of the rod or bolt 31, a suitable lubricant may be placed in the chamber 32 formed in the projection 29.

In operation, when the wheels 45 strike an obstruction there is an upward thrust exerted upon the vehicle through the coil spring 30 by reason of the fact that the end of the arm 20 at the point 21 is thrust upwardly while the inner end of the arm which engages the bearing member 24, is given a downward pull tending to counterbalance the force of the thrust at the end 21, bringing the opposing weight centrally of the arm upon the member 10. This causes a communicating portion of the downward forces to tend to compress the spring 30, bringing the load supported upon the member 10 downward upon an almost horizontal line of action, preventing the usual lateral tipping thrust caused by springs of other types.

The arms 20 bearing downwardly upon the shaft or member 14 normally tend to distribute load weights applied to the member 10 without great tipping action out of the horizontal plane upon the member 10. The result being that loads applied upon one side of the member 10 having its weights distributed to the opposite side of the member 10, through the co-operating members 20 and springs 30, gives the member 10 a uniform upward and downward action preventing the usual side sway in the vehicle body. This will prevent skidding of the vehicle which would be caused by the rocking action usually obtained in other spring suspensions.

The connecting bolts or rods 31 with their co-operating members act to snub against the unsprung weight carried beneath the springs, tending to apply the unsprung weight to limit and cushion the upward movements of the load carried on the member 10. The opposed actions of the springs 25 against the arms 20 tend to cause a uniform cushioning flexating action of the co-operating springs against unrestricted flexations backward and forward, giving gradual movements and taking successive rebounds found in other springs, out of the spring operation.

The springs 25 co-operating with the ends of the arms 20 oppose the inner projecting arms and cause them to be maintained in a central position with respect to their relative action and act as compensating elements in which the members or bearings 24 may reciprocate back and forth upon the shaft or member 14, maintaining them under noiseless spring engaging tension.

This construction permits the arms 20 to be deflected laterally with respect to the member 10 and will permit of the arc movement of the rear axle caused by the movement of the vehicle under road conditions and by the connecting rods which usually maintain the axle in position, when the connecting rod swings about its point of pivotal connection with the body frame.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a spring suspension for vehicles, a load supporting member, opposed load supporting arms therebelow, means pivotally connecting one end of the arms to the said member, means pivotally connecting the other ends of the arm to the vehicle running gear, and elastic means interposed between the arms and the said member to cushion their relative movements, the first recited means embodying means to permit longitudinal movement of the said member and the ends of the arms one with relation to the other.

2. In a spring suspension for vehicles, a load supporting member, opposed load supporting arms therebelow, means pivotally connecting one end of the arms to the said member, means pivotally connecting the other ends of the arm to the vehicle running gear, elastic means interposed between the arms and the said member to cushion their relative movements, the first recited means embodying means to permit longitudinal movement of the said member and the ends of the arms one with relation to the other, and resilient means for cushioning the last recited relative movement.

3. In a spring suspension for vehicles, a load supporting member, opposed load supporting arms therebelow, means pivotally connecting one end of the arms to the said member, means pivotally connecting the other end of the arm to the vehicle running gear, and elastic means interposed between the arms and the said member to cushion their relative movements, the first recited means embodying means to permit a longitudinal and a swiveling movement of the said member and the ends of the arms one with relation to the other.

4. In a spring suspension for vehicles, a load supporting member, opposed load supporting arms therebelow, means pivotally connecting one end of the arms to the said member, means connecting the other ends of the arms to the vehicle running gear, and means for cushioning the relative movements of the said arms and the said member, the first recited means including means to permit longitudinal movement of the said member and the ends of the arms one with relation to the other and operating to permit a swivel action of the arms and member on an axis common to the direction of the said longitudinal movement.

5. In a spring suspension for vehicles, a load supporting member, opposed load supporting arms therebelow, means pivotally connecting one end of the arms to the said member, means connecting the other ends of the arms to the vehicle running gear, means for cushioning the relative movements of the said arms and the said member, the first recited means including means to permit longitudinal movement of the said member and the ends of the arms one with relation to the other and operating to permit a swivel action of the arms and member on an axis common to the direction of the said longitudinal movement, and additional means for cushioning the said longitudinal movement of the parts.

6. In a spring suspension for vehicles, a load supporting member, opposed load supporting arms therebelow, means pivotally connecting one end of the arms to the vehicle running gear, means pivotally and separately connecting the other ends of the said arms to the said member, the last recited means including means permitting a longitudinal movement of the said member and the last recited ends of the said arms one with respect to the other, and resilient means cooperating with the last said ends of the said arms and the said member for normally centralizing and cushioning the longitudinal forces of the said member and the ends of the arms with respect to each other.

7. In a spring suspension for vehicles, a load supporting member, opposed load supporting arms therebelow, means pivotally connecting one end of the arms to the vehicle running gear, means connecting the other ends of the arms with the said member for pivotal movement and also for movement with respect to the said member in directions transverse to the axis of the pivots, the last recited means also permitting a relative lateral movement of the arms and said member one with relation to the other, and means for limiting the first recited pivotal movement of the arms and member with respect to each other.

8. In a spring suspension for vehicles, a load supporting member, opposed load supporting arms therebelow, means pivotally connecting one end of the arms to the vehicle running gear, means connecting the other ends of the arms with the said member for pivotal movement and also for movement with respect to the said member in directions transverse to the axis of the pivots, the last recited means also permitting a relative lateral movement of the arms and said member one with relation to the other, cushioning means interposed between the said member and the respective said arms and intermediate the ends of the latter, and means for limiting the first recited pivotal movement of the arms and member with respect to each other.

9. In a spring suspension for vehicles, a load supporting member, opposed load supporting arms therebelow, means pivotally connecting one end of the arms to the vehicle running gear, means connecting the other ends of the arms with the said member for pivotal movement and also for movement with respect to the said member in directions transverse to the axis of the pivots, the last recited means also permitting a relative lateral movement of the arms and said member one with relation to the other, means for limiting the first recited pivotal movement of the arms and member with respect to each other, and means for cushioning the said relative longitudinal movement, the last recited means tending to normally centralize the pivotal point of connection between the ends of the arms and the load supporting member.

10. In a spring suspension for vehicles a load supporting member, opposed load supporting arms therebelow, means pivotally connecting one end of the arms to the vehicle running gear, a bearing member connected with the first said member, and bearings slidably and rotatably mounted upon the bearing member and to which bearings the other ends of the respective arms are connected for pivotal movement with respect thereto on axes transverse to the longitudinal axis of the said bearing member.

11. In a spring suspension for vehicles a load supporting member, opposed load supporting arms therebelow, means pivotally connecting one end of the arms to the vehicle running gear, a bearing member connected with the first said member, bearings slidably and rotatably mounted upon the bearing member and to which bearings the other ends of the respective arms are connected for pivotal movement with respect thereto on axes transverse to the longitudinal axis of the said bearing member, and means for limiting the relative pivotal movement of the said arms and the said load supporting member.

12. In a spring suspension for vehicles a load supporting member, opposed load supporting arms therebelow, means pivotally connecting one end of the arms to the vehicle running gear, a bearing member connected with the first said member, bearings slidably and rotatably mounted upon the bearing member and to which bearings the other ends of the respective arms are connected for pivotal movement with respect thereto on axes transverse to the longitudinal axis of the said bearing member, and cushioning means interposed between the said load supporting member and the respective arms and intermediate the ends of the latter.

13. In a spring suspension for vehicles, a load supporting member, opposed load supporting arms therebelow, means pivotally connecting one end of the arms to the vehicle running gear, a bearing member connected with the first said member, bearings slidably and rotatably mounted upon the bearing member and to which bearings the other ends of the respective arms are connected for pivotal movement with respect thereto on axes transverse to the longitudinal axis of the said bearing member, and resilient means interposed between the said bearings and the said load supporting member and tending to centralize the pivotal point of connection between the ends of the arms and the load supporting member.

14. In a spring suspension for vehicles, a load supporting member, opposed load supporting arms therebelow, means pivotally connecting one end of the arms to the vehicle running gear, a bearing member connected with the first said member, bearings slidably and rotatably mounted upon the bearing member and to which bearings the other ends of the respective arms are connected for pivotal movement with respect thereto on axes transverse to the longitudinal axis of the said bearing member, and resilient means individual to the said bearings, encompassing the said bearing member and interposed between the respective bearings and the said load supporting member and operating to cushion the said bearings and tending to normally centralize the point of pivotal connection of the said arms with the load supporting member.

15. In a spring suspension for vehicles, a load supporting member, opposed load supporting arms therebelow, means pivotally connecting one end of the arms to the vehicle running gear, a bearing member connected with the first said member, bearings slidably and rotatably mounted upon the bearing member and to which bearings the other ends of the respective arms are connected for pivotal movement with respect thereto on axes transverse to the longitudinal axis of the said bearing member, and means for lubricating the said bearings through the said bearing member.

16. In a spring suspension for vehicles, a load supporting member, opposed load supporting arms therebelow, means pivotally connecting one end of the arms to the vehicle running gear, a bearing member connected with the first said member, bearings slidably and rotatably mounted upon the bearing member and to which bearings the other ends of the respective arms are connected for pivotal movement with respect thereto on axes transverse to the longitudinal axis of the said bearing member, resilient means interposed between the load supporting member and the respective arms and intermediate the ends of the latter, and means for limiting the pivotal movement of the arms and load supporting member towards and away from each other.

17. In a spring suspension for vehicles, a load supporting member, opposed load supporting arms therebelow, means pivotally connecting one end of the arms to the vehicle running gear, a bearing member connected with the first said member, bearings slidably and rotatably mounted upon the bearing member and to which bearings the other ends of the respective arms are connected for pivotal movement with respect thereto on axes transverse to the longitudinal axis of the said bearing member, resilient means interposed between the load supporting member and the respective arms and intermediate the ends of the latter, and means for limiting the pivotal movement of the arms and load supporting member towards and away from each other, the last recited means including a connecting bar yieldably connected with one of the last two recited parts and yieldingly connected with the other of said parts.

18. In a spring suspension for vehicles, a load supporting member, a load supporting arm therebelow, means pivotally connecting one end of the arm with the vehicle running gear, means connecting the other end of the arm with the said member for a pivotal, a longitudinal and a lateral swivel action with respect thereto, a resilient member interposed between the load supporting member and the arm intermediate the ends of the latter, and means for limiting the pivotal movement of the said member and arm one with respect to the other, the last said means including a shouldered rod, said shoulder loosely engaging one of the parts, said rod passing loosely through the other part, an adjustable collar on the end of the rod, and a resilient element encompassing the rod and engaging the collar and the other of the parts.

19. In a spring suspension for vehicles, a load supporting member, a load supporting arm therebelow, means pivotally connecting the respective ends of the arm with the vehicle running gear and the said member, a resilient element interposed between the said member and the said arm intermediate the ends of the latter, means for limiting the relative pivotal movement of the arm and member, the last said means including a shouldered rod passing loosely through the said member with the head engaging the member, the other end of the rod passing through and beyond said arm, a collar on the end of the rod, a member loosely encompassing the rod and abutting the said collar, a second resilient element interposed between the last said member and the said arm, and a third resilient element interposed between the last said member and the said arm, the last said resilient element operating to maintain the said second resilient element seated against the said arm when the said collar on the said rod moves away from the said arm.

20. In a spring suspension for vehicles, a load supporting member, a load supporting arm therebelow, means pivotally connecting the ends of the arm respectively with said member and the vehicle running gear, a resilient element interposed between the said member and the arm and intermediate the ends of the latter, means for limiting the relative movement of the arm and member, said means including a rod connected with the said member and passing loosely through and beyond the arm, a collar on the end of the rod, a member loosely encompassing the rod and engaging the collar, a second resilient element encompassing the rod and engaging the arm and the last said member, and a third resilient element encompassing the rod and engaging the second recited member and the said collar.

21. In a spring suspension for vehicles, a load supporting member, a load supporting arm therebelow, means pivotally connecting the ends of the arm respectively with said member and the vehicle running gear, a resilient element interposed between the said member and the arm and intermediate the ends of the latter, means for limiting the relative movement of the arm and member, said means including a rod connected with the said member and passing loosely through and beyond the arm, a collar on the end of the rod, a member loosely encompassing the rod and engaging the collar, a second resilient element encompassing the rod and engaging the arm and the last said member, a third resilient element encompassing the rod and engaging the second recited member and the said collar, and a noise deadening element interposed between the said collar and the last recited member.

22. In a spring suspension for vehicles, a load supporting member, a load supporting arm therebelow, means pivotally connecting the ends of the arm respectively with said member and the vehicle running gear, a resilient element interposed between the said member and the arm and intermediate the ends of the latter, means for limiting the relative movement of the arm and member, said means including a rod connected with the said member and passing loosely through and beyond the arm, a collar on the end of the rod, a member loosely encompassing the rod and engaging the collar, a second resilient element encompassing the rod and engaging the arm and the last said member, a third resilient element encompassing the rod and engaging the second recited member and the said collar, the said rod having a shoulder seated in a recess in the load supporting member, and means in the recess for holding the shoulder seated.

23. In a spring suspension for vehicles, a load supporting member, a load supporting arm therebelow, means pivotally connecting the ends of the arm respectively with said member and the vehicle running gear, a resilient element interposed between the said member and the arm and intermediate the ends of the latter, means for limiting the relative movement of the arm and member, said means including a rod connected with the said member and passing loosely through and beyond the arm, a collar on the end of the rod, a member loosely encompassing the rod and engaging the collar, a second resilient element encompassing the rod and engaging the arm and the last said member, a third resilient element encompassing the rod and engaging the second recited member and the said collar, the said rod having a shoulder seated in a recess in the load supporting member, a closure for the recess and resilient means interposed between the rod and the said closure for holding the said shoulder seated.

24. In a spring suspension for vehicles, a load supporting member, a load supporting arm therebelow, means pivotally connecting the ends of the arm respectively with said member and the vehicle running gear, a resilient element interposed between the said member and the arm and intermediate the ends of the latter, means for limiting the relative movement of the arm and member, said means including a rod connected with the said member and passing loosely through and beyond the arm, a collar on the end of the rod, a member loosely encompassing the rod and engaging the collar, a second resilient element encompassing the rod and engaging the arm and the last said member, a third resilient element encompassing the rod and engaging the second recited member and the said collar, the said rod having a shoulder seated in a recess in the load supporting member, and means in the recess for holding the shoulder seated, the said recess being adapted to hold a lubricant for the end of the rod.

In testimony whereof I have signed my name to this specification October, A. D. 1924.

RANSOM Y. BOVEE.